United States Patent
Kim et al.

(10) Patent No.: US 8,264,778 B2
(45) Date of Patent: Sep. 11, 2012

(54) DISPLAY SUBSTRATE, METHOD OF MANUFACTURING THE SAME AND ELECTROWETTING DISPLAY PANEL HAVING THE DISPLAY SUBSTRATE

(75) Inventors: Hyang-Yul Kim, Gyeonggi-do (KR); Hee-Seop Kim, Gyeonggi-do (KR); Joo-Nyung Jang, Gyeongbuk (KR); Hwa-Sung Woo, Gyeonggi-do (KR); Cheol Shin, Gyeonggi-do (KR); Dong-Chul Shin, Seoul (KR); Yong-Hwan Shin, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/082,575

(22) Filed: Apr. 8, 2011

(65) Prior Publication Data

US 2011/0181952 A1    Jul. 28, 2011

Related U.S. Application Data

(62) Division of application No. 12/502,648, filed on Jul. 14, 2009, now Pat. No. 8,068,266.

(30) Foreign Application Priority Data

Dec. 24, 2008 (KR) .............................. 2008-132748

(51) Int. Cl.
    *G02B 1/06* (2006.01)
(52) U.S. Cl. ........................................ 359/665; 359/666
(58) Field of Classification Search .................. 359/665, 359/666
    See application file for complete search history.

(56) References Cited

U.S. PATENT DOCUMENTS

2008/0297880 A1 *  12/2008  Steckl et al. .................. 359/291

* cited by examiner

*Primary Examiner* — William Choi
(74) *Attorney, Agent, or Firm* — Frank Chau & Associates, LLC

(57) ABSTRACT

A display substrate includes a base substrate, a reflection-polarization member, a first electrode, an insulation layer and a pixel wall. The reflection-polarization member is disposed on the base substrate to reflect and polarize incident light. The first electrode is disposed in a unit pixel area of the reflection-polarization member. The insulation layer is disposed on the first electrode. The pixel wall is disposed on the insulation layer and defines the unit pixel area. Therefore, the entire area of a unit pixel may be used as a reflective area or a transmissive area, and thus an aperture ratio may be improved in a reflection mode or a transmission mode.

6 Claims, 12 Drawing Sheets

DISPLAY SUBSTRATE, METHOD OF MANUFACTURING THE SAME AND ELECTROWETTING DISPLAY PANEL HAVING THE DISPLAY SUBSTRATE

PRIORITY STATEMENT

This Application is a divisional of U.S. patent application Ser. No. 12/502,648 filed on Jul. 14, 2009 now U.S. Pat. No. 8,068,266, which claims priority to Korean Patent Application No. 2008-132748, filed on Dec. 24, 2008 in the Korean Intellectual Property Office (KIPO), the contents of which are herein incorporated by reference in their entirety.

BACKGROUND OF THE INVENTION

1. Technical Field

Example embodiments of the present invention relate to a display substrate, and, more particularly, to a display substrate used in an electrowetting display device, a method of manufacturing the display substrate, and an electrowetting display panel having the display substrate.

2. Discussion of the Related Art

An electrowetting technique refers to coating a hydrophobic insulator on an electrode and varying the contact angle of a conductive liquid (e.g., water) and an interface shape of the conductive liquid and a non-conductive liquid (e.g., oil) by controlling surface characteristics of the hydrophobic insulator. Surface characteristics of the hydrophobic insulator are controlled by applying a voltage to the electrode and the conductive liquid, when the conductive liquid and the non-conductive liquid contact each other on the coated hydrophobic insulator. When a voltage is applied to a counter electrode that contacts water and a pixel electrode disposed under the hydrophobic insulator, the nature of the interface is changed to hydrophilic. The water is moved to contact the changed hydrophobic insulator, and thus the water pushes the oil because the contact angle of the water is decreased. As a result, contrast is displayed through the reflection of light.

A display device employing the electrowetting technology does not use a polarization plate, so that the display device employing the electrowetting technology has superior transmittance and reflectance, low manufacturing costs and power consumption and fast response time. Accordingly, there is a need for a display using the electrowetting technology.

SUMMARY OF THE INVENTION

Example embodiments of the present invention provide a display substrate capable of using the entire area of a unit pixel area as a reflective area or a transmissive area, a method of manufacturing the display substrate, and a display device having the display substrate.

According to an embodiment of the present invention, a display substrate includes a base substrate, a reflection-polarization member, a first electrode, an insulation layer and a pixel wall. The reflection-polarization member is disposed on the base substrate to reflect and polarize incident light. The first electrode is disposed in a unit pixel area of the reflection-polarization member. The insulation layer is disposed on the first electrode. The pixel wall is disposed on the insulation layer and defines the unit pixel area.

According to an embodiment, the reflection-polarization member may include a plurality of wire grids spaced apart from each other at a uniform distance.

According to an embodiment, the display substrate may further include a switching element connected to a gate line and a data line crossing the gate line to drive the unit pixel area and the first wall may overlap with the gate line and the data line.

According to an embodiment, the reflection-polarization member may include a half mirror.

According to an embodiment, the display substrate may further include at least one second pixel wall dividing the unit pixel area into at least one sub-pixel area.

According to an embodiment, the display substrate may further include a light-blocking bar overlapping with the second pixel wall.

According to an embodiment, the first electrode may include at least one pattern. The pattern may be formed in the sub-pixel area.

According to an embodiment of the present invention, there is provided a method of manufacturing a display substrate. In the method, a switching element and a reflection-polarization member reflecting and polarizing incident light are formed on a base substrate. A first electrode is formed on the base substrate on which the switching element and the reflection-polarization member are formed. An insulation layer is formed on the base substrate on which the first electrode is formed. A first pixel wall defining a unit pixel area is formed on the base substrate on which the insulation layer is formed.

According to an embodiment, forming the switching element and the reflection-polarization member includes forming a gate pattern by patterning a gate metal layer on the base substrate, wherein the gate pattern includes a gate electrode connected with a gate line and a plurality of wire grids, forming the gate insulation layer on the base substrate on which the gate pattern is formed, forming a semiconductor pattern on the base substrate on which the gate insulation layer is formed so that the semiconductor pattern overlaps the gate electrode at least in part, and forming a source pattern by patterning a source metal layer on the base substrate on which the semiconductor pattern is formed, wherein the source pattern includes a data line intersecting the gate line, a source electrode of the switching element connected to the data line and a drain electrode spaced apart from the source electrode.

According to an embodiment, forming the switching element and the reflection-polarization member includes forming a half mirror by depositing a metal layer on the base substrate, forming a passivation film on the base substrate on which the half mirror is formed, forming a gate pattern by patterning a gate metal layer on the base substrate on which the passivation film is formed, wherein the gate pattern comprises a gate line and a gate electrode connected to the gate line, forming the gate insulation layer on the base substrate on which the gate pattern is formed, forming a semiconductor pattern on the base substrate on which the gate insulation layer is formed so that the semiconductor corresponds to the gate electrode and forming a source pattern by patterning a source metal layer on the base substrate on which the semiconductor pattern is formed, wherein the source pattern includes a data line intersecting the gate line, a source electrode of the switching element connected to the data line and a drain electrode spaced apart from the source electrode.

According to an embodiment of the present invention, an electrowetting display panel includes a display substrate, an opposite substrate and a liquid layer. The display substrate includes a first base substrate, a reflection-polarization member disposed on the first base substrate to reflect and polarize incident light, a first electrode disposed on the reflection-polarization member, and a first pixel wall disposed on the first electrode, wherein the first pixel wall defines a unit pixel area. The opposite substrate faces the display substrate. The opposite substrate includes a color filter and a second electrode formed on the color filter. The liquid layer is interposed between the display substrate and the opposite substrate. The liquid layer includes a first liquid having a material absorbing light and a second liquid having a specific gravity different from the specific gravity of the first liquid.

According to the embodiments of the present invention, a reflection-polarization member that reflects and polarizes incident light is employed therein, so that the entire area of a unit pixel area may be used as a reflective area or a transmissive area.

BRIEF DESCRIPTION OF THE DRAWINGS

The above and other features of the present invention will become more apparent by describing in detail example embodiments thereof with reference to the accompanying drawings, in which.

DETAILED DESCRIPTION OF EXEMPLARY EMBODIMENTS

Figure 1:
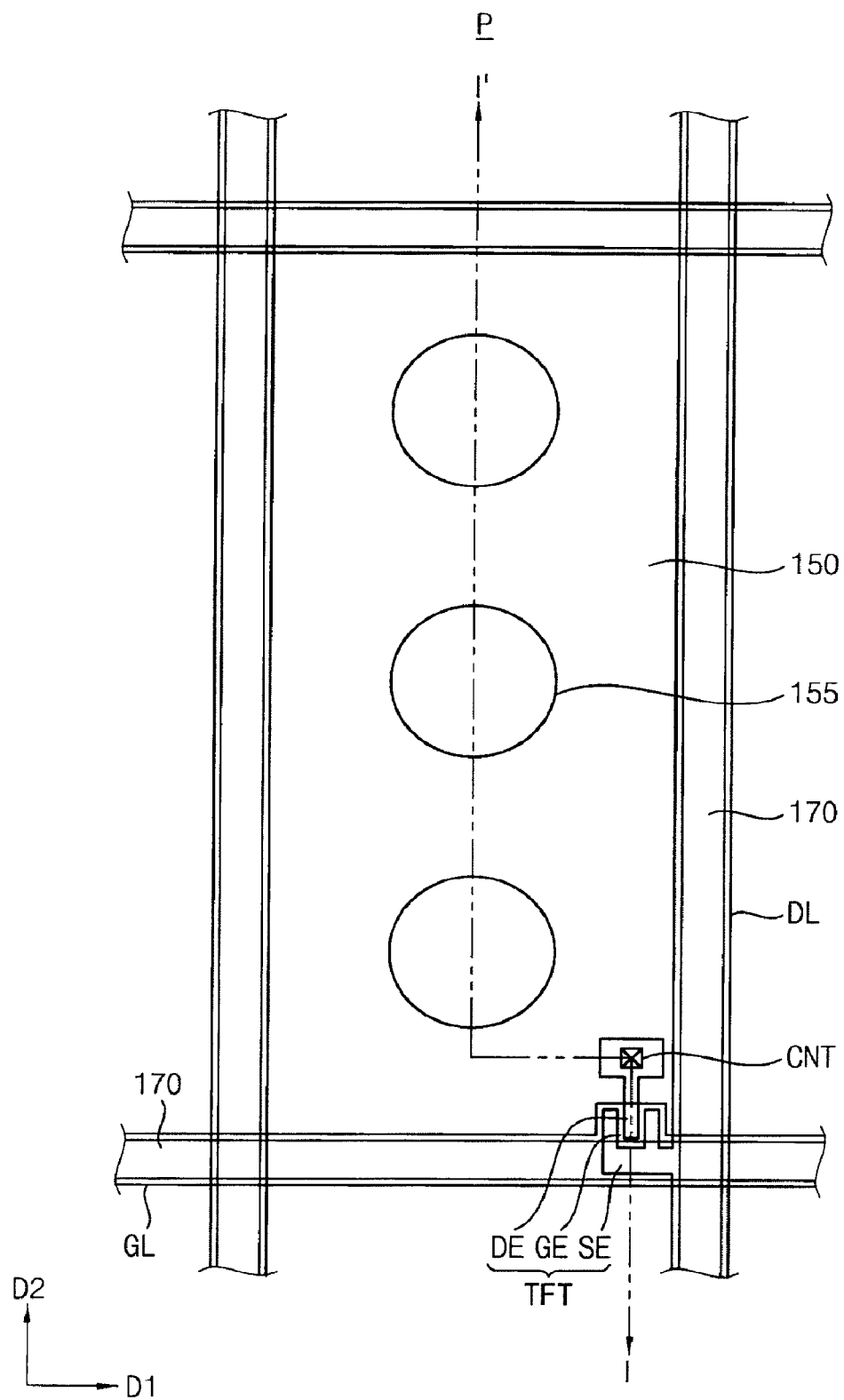
FIG. 1 is a plan view illustrating an electrowetting display panel according to an exemplary embodiment of the present invention.

The embodiments of the present invention are described more fully hereinafter with reference to the accompanying drawings, in which example embodiments of the present invention are shown. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. Like numerals may refer to like elements throughout.

Figure 2:
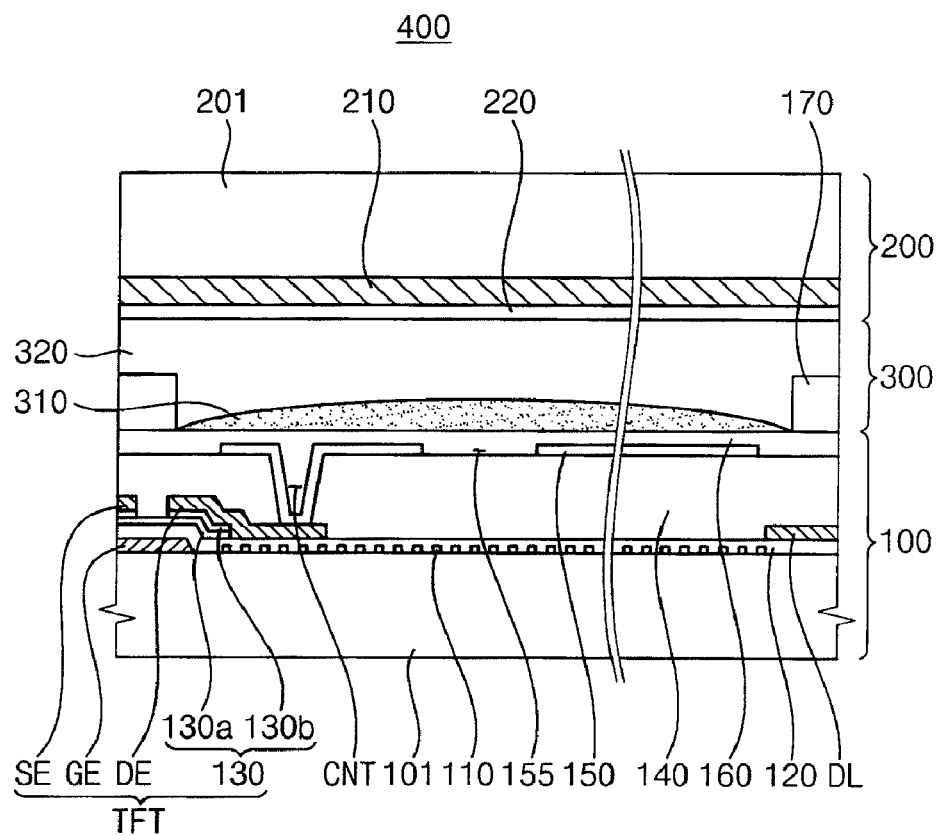
FIG. 2 is a cross-sectional view taken along a line I-I' in FIG. 1.
Figure 3:
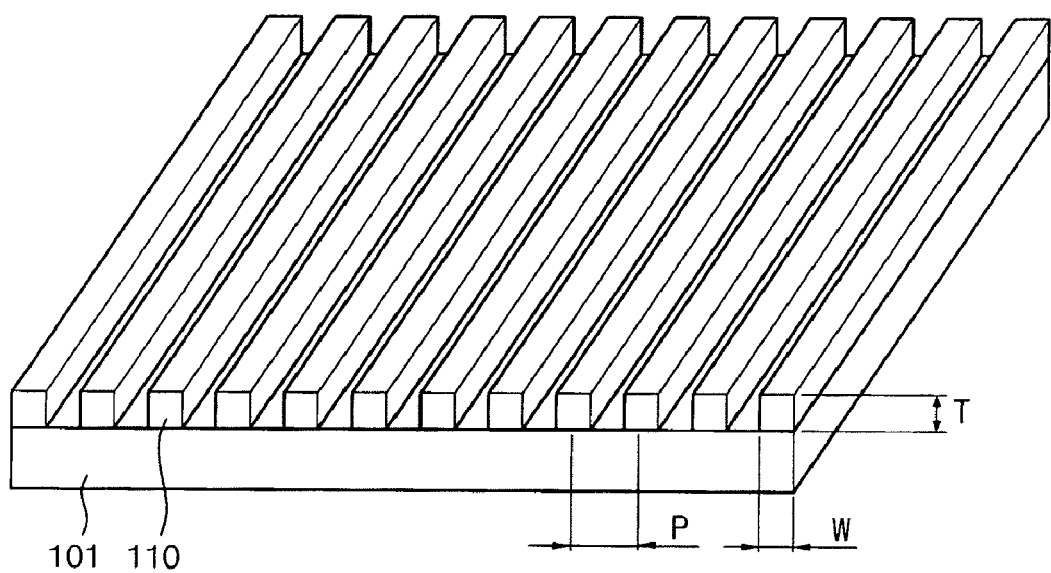
FIG. 3 is a perspective view illustrating a reflection-polarization member of FIG. 2.

FIG. 1 is a plan view illustrating an electrowetting display panel according to an exemplary embodiment of the present invention. FIG. 2 is a cross-sectional view taken along a line I-I' in FIG. 1. FIG. 3 is a perspective view illustrating a reflection-polarization member of FIG. 2.

Referring to FIGS. 1 to 3, the electrowetting display panel 400 according to an embodiment of the present invention includes a display substrate 100, an opposite substrate 200 and a liquid layer 300.

The display substrate 100 includes a first base substrate 101, a gate line GL, a plurality of wire grids 110, a gate insulation layer 120, a data line DL, a switching element TFT, an organic layer 140, a first electrode 150, a hydrophobic insulation layer 160 and a first hydrophilic pixel wall 170.

The first base substrate 101 may be formed with a transparent insulation material. For example, the first base substrate 101 may include a glass substrate, a soda-lime substrate, a plastic substrate, etc.

The gate lines GL are formed on the first base substrate 101. The gate lines GL are extended in a first direction D1. The plurality of gate lines GL may be arranged in a second direction D2 substantially perpendicular to the first direction D1.

The data lines DL are extended in the second direction D2. The plurality of data lines DL may be arranged in the first direction D1.

The wire grids 110 are formed on the first base substrate 101. The wire grids 110 have a predetermined wire width 'W' and a thickness 'T'. The wire grids 110 are extended along the first direction D1 and disposed along the second direction D2. The wire grids 110 may be spaced apart from each other at a substantially uniform distance. The wire grids 110 may be formed in a stripe shape. The wire grids 110 may include a material of which reflectance is high and a light-absorption ratio is low. For example, the wire grids 110 may include a metal such as aluminum (Al), silver (Ag), copper (Cu), molybdenum (Mo), etc.

The wire grids 110 reflect and polarize incident light into a first surface of the first base substrate 101 or incident light into a second surface of the first base substrate 101 opposite to the first surface. Light having an electric field vector substantially parallel to an extending direction (i.e., a first direction D1) of the wire grids 110 is defined as an s-polarized light, and light having an electric field vector substantially perpendicular to the extending direction D1 of the wire grids 110 is defined as a p-polarized light. The wire grids 110 reflect the s-polarized light and transmit the p-polarized light. Therefore, most of light transmitted through the wire grids 110 is the p-polarized light.

A polarization function of the wire grids 110 depends on the wire width 'W', the thickness 'T' and a pitch 'P' of the respective wire grids 110. The pitch 'P' is defined as an interval between the wire grids 110. The pitch 'P' may be shorter than the wavelength of the incident light for a good polarization function of the wire grids 110. For example, when the incident light is visible light, the pitch 'P' is designed to be not greater than about 400 nm because the wavelength of the visible light is about 400 nm through about 700 mm. Therefore, according to an embodiment of the present invention, the pitch 'P' is designed to be not greater than about 100 nm, resulting in a good polarization function of the wire grids 110. The wire width 'W' of respective wire grids 110 is designed to be not greater than about 100 nm. The thickness 'T' of respective wire grids 110 is designed to be about 150 nm to about 200 nm.

The gate insulation layer 120 is disposed on a gate electrode GE of the switching element TFT and the wire grids 110.

The switching element TFT includes the gate electrode GE, a source electrode SE, a semiconductor pattern 130 and a drain electrode DE. The gate electrode is electrically connected with the gate line GL and the source electrode SE is electrically connected with the data line DL. The semiconductor pattern 130 on the gate insulation layer 120 overlaps the gate electrode GE, at least in part. The semiconductor pattern 130 includes a semiconductor layer 130a and an ohmic contact layer 130b. The drain electrode DE is disposed to be spaced apart from the source electrode at a predetermined distance.

The organic layer 140 disposed on the first base substrate 101 on which the switching element TFT is formed. The organic layer 140 may be formed with a photosensitive organic material. The organic layer 140 may flatten the display substrate 100 and the organic layer may be omitted in accordance with design constraints. The organic layer 140 includes a contact hole CNT exposing an end portion of the drain electrode DE.

The first electrode 150 is disposed on the first base substrate 101 on which the organic layer 140 is formed, and the first electrode 150 may be formed with a transparent conductive material. For example, the first electrode 150 may be formed with indium tin oxide (ITO), indium zinc oxide (IZO), etc. The first electrode 150 may be electrically connected with the switching element TFT by contacting the drain electrode DE through the contact hole CNT. The first electrode 150 may cover the unit pixel area P divided by the first hydrophilic pixel wall 170. The first electrode 150 may include a plurality of hole patterns 155. Each of the hole patterns 155 may have a circular shape.

Referring, for example, to FIG. 1, a case in which three hole patterns 155 are formed in the first electrode 150 is described and shown as an example; however, different numbers of hole patterns may be formed in the first electrode 150. For example, one hole pattern 155 may be formed in the first electrode 150.

The hydrophobic insulation layer 160 is disposed on the base substrate 101 on which the first electrode 150 is formed.

The first hydrophilic pixel wall 170 is disposed on the base substrate 101 on which the hydrophobic insulation layer 160 is formed. The first hydrophilic pixel wall 170 defines the unit pixel area. The first hydrophilic pixel wall 170 may be formed with a transparent material. The first hydrophilic pixel wall 170 is formed on an opaque metal line. For example, the first hydrophilic pixel wall 170 may be formed on the gate line GL and the data line DL.

The opposite substrate 200 may include a second base substrate 201, a color filter 210 and a second electrode 220.

Like the first base substrate 101, the second base substrate 201 may be formed with a transparent insulation material.

The color filter 210 is disposed on the second base substrate 201. The color filter 210 may include a red color filter, a green color filter and a blue color filter.

The second electrode 220 is disposed on the second base substrate 201 on which the color filter 210 is formed and the second electrode 220 may be formed with a transparent conductive material. The second electrode 220 may cover a front surface of the second base substrate 201. For example, the second electrode 220 may cover the unit pixel area P of the second base substrate. The second electrode may be formed with ITO, IZO, etc.

The liquid layer 300 is interposed between the display substrate 100 and the opposite substrate 200. The liquid layer 300 may include a first liquid 310 and a second liquid 320. The specific gravity of the first liquid 310 is different from the specific gravity of the second liquid 320, and thus the first liquid 310 and the second liquid 320 form a boundary. The first liquid 310 serves as a light shutter blocking and transmitting light. The first liquid 310 may be a black dye or oil including a material absorbing light. The second liquid 320 has conductivity and polarity, and may be, for example, water.

Figure 4A:
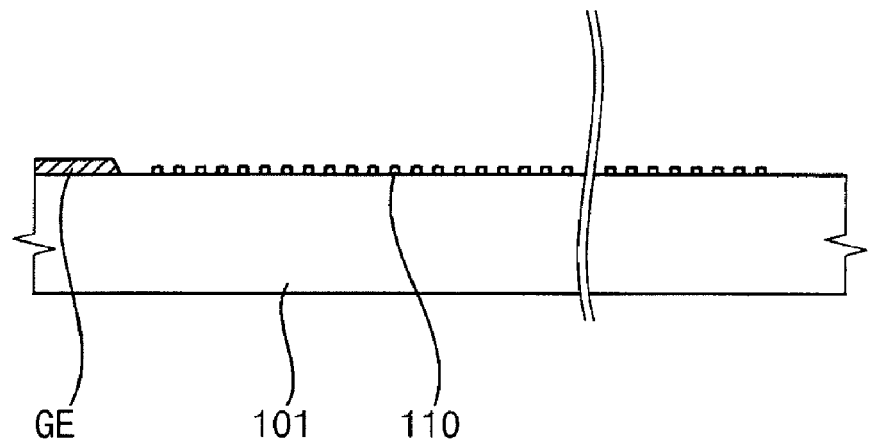
FIGS. 4A through 4C are cross-sectional views illustrating a method of manufacturing the display substrate of FIG. 2.
Figure 4B:
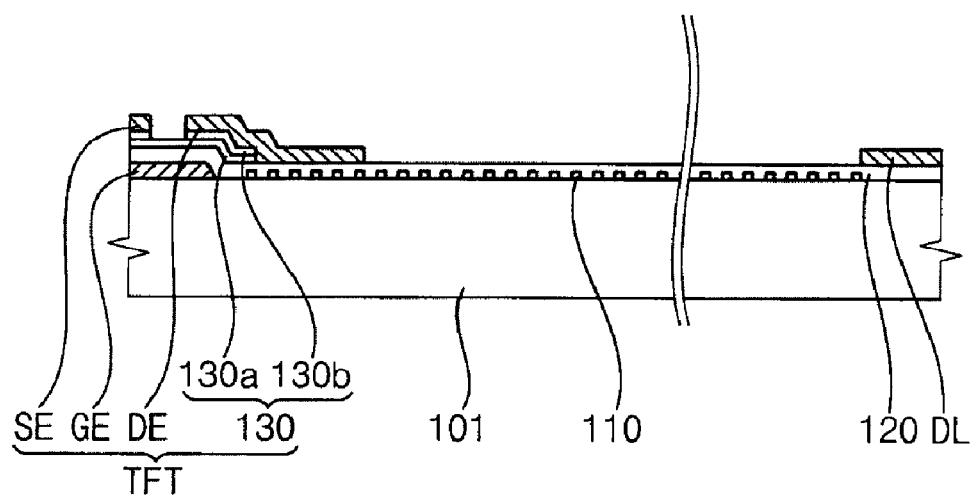
Figure 4C:
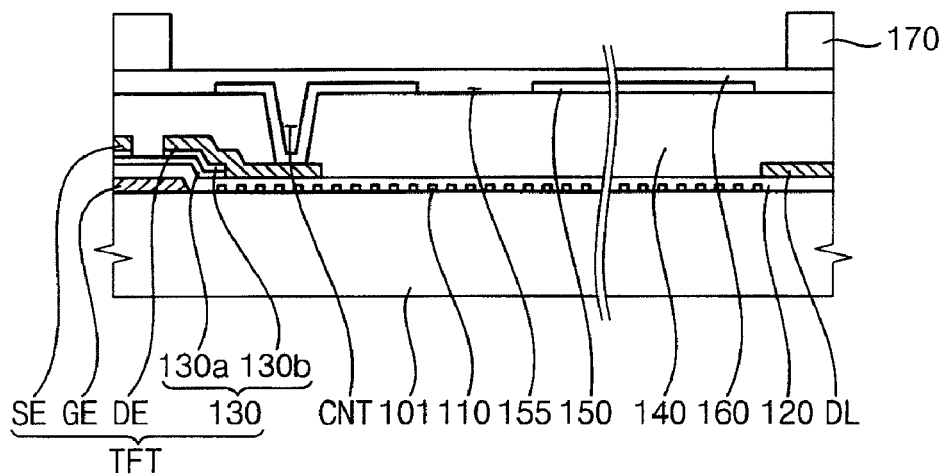

FIGS. 4A through 4C are cross-sectional views illustrating a method of manufacturing the display substrate of FIG. 2.

Referring to FIGS. 2 and 4A, a gate metal layer is formed on the first base substrate 101. The gate line GL, the gate electrode GE and the wire grids 110 are formed by patterning the gate metal layer. The gate electrode GE and the wire grids are separated from each other. The wire grids 110 may be formed by using a laser interference lithography method or a nanoimprint lithography method.

According to the laser interference lithography method, a photoresist is coated after a metal layer is deposited on a substrate. The photoresist is exposed by using a mask on which a pattern is formed and a photoresist pattern is formed by developing the exposed photoresist. The metal layer is patterned through an etching process and the photoresist is eliminated to form the wire grids 110.

According to the nanoimprint lithography method, a coating layer is formed on a substrate and the coating layer is pressed by a mold on which a pattern is formed. The coating layer is hardened by using heat or ultraviolet (UV) rays and the mold is separated from the coating layer to form the wire grids 110 on the coating layer. A metal layer is deposited on the wire grids 110.

Referring to FIGS. 2 and 4B, the gate insulation layer 120 is formed on the first base substrate 101 on which the gate metal pattern is formed. The gate insulation layer 120 may be formed with silicon nitride material or silicon oxide material, etc.

The semiconductor layer 130a and the ohmic contact layer 130b are sequentially deposited on the first base substrate 101 on which the gate insulation layer 120 is formed, and the semiconductor pattern 130 is formed by patterning the semiconductor layer 130a and the ohmic contact layer 130b. The semiconductor layer 130a may be formed with amorphous silicon and the ohmic contact layer 130b may be formed with amorphous silicon highly doped with n-type impurities.

A source metal layer is formed on the first base substrate 101 on which the semiconductor pattern 130 is formed. A source metal pattern including the data line DL, the source electrode SE and the drain electrode DE is formed through a photoetching process of the source metal layer.

Referring to FIGS. 2 and 4C, the organic layer 140 is formed on the first base substrate 101 on which the source metal pattern is formed, and the contact hole CNT is formed exposing the end portion of the drain electrode DE by exposing and developing the organic layer 140.

A transparent conductive layer is formed on the first base substrate 101 on which the contact hole CNT is formed. The first electrode 150 is formed by patterning the transparent conductive layer.

Figure 5:
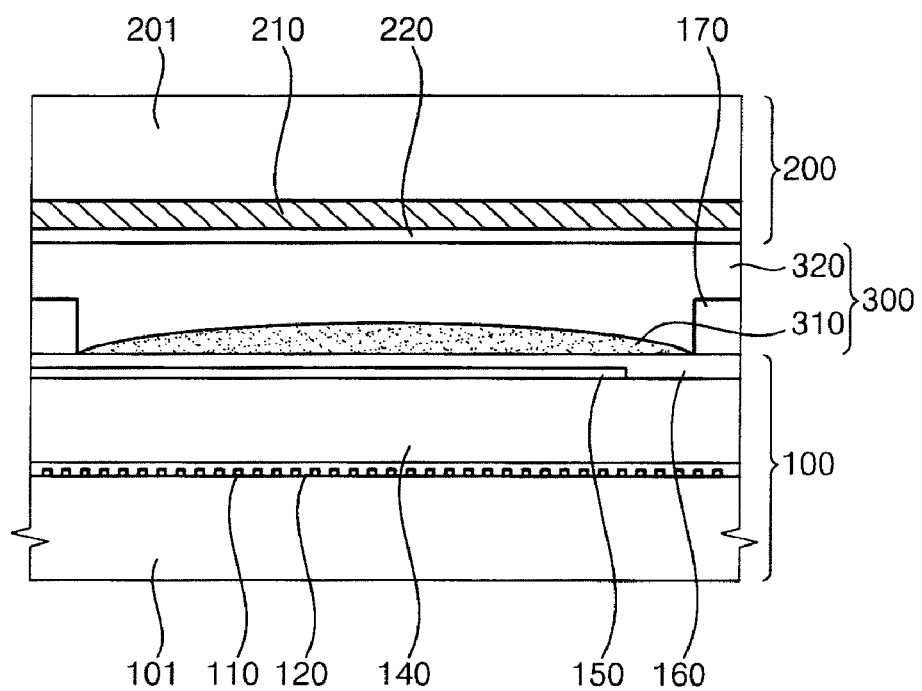
FIG. 5 is a cross-sectional view illustrating a display state of the electrowetting display panel of FIG. 2 when an electric field is not applied to the electrowetting display panel.

FIG. 5 is a cross-sectional view illustrating a display state of the electrowetting display panel of FIG. 2 when an electric field is not applied to the electrowetting display panel.

Referring to FIG. 5, when a voltage is not applied to the first electrode 150 and the second electrode 220, the first liquid 310 is widely spread on the hydrophobic insulation layer 160. Therefore, external light that is incident light from the exterior or internal light that is incident light from an internal light source device (not shown) is absorbed by the first liquid 310. Therefore, the display state of the electrowetting display panel 400 is a dark state.

Figure 6:
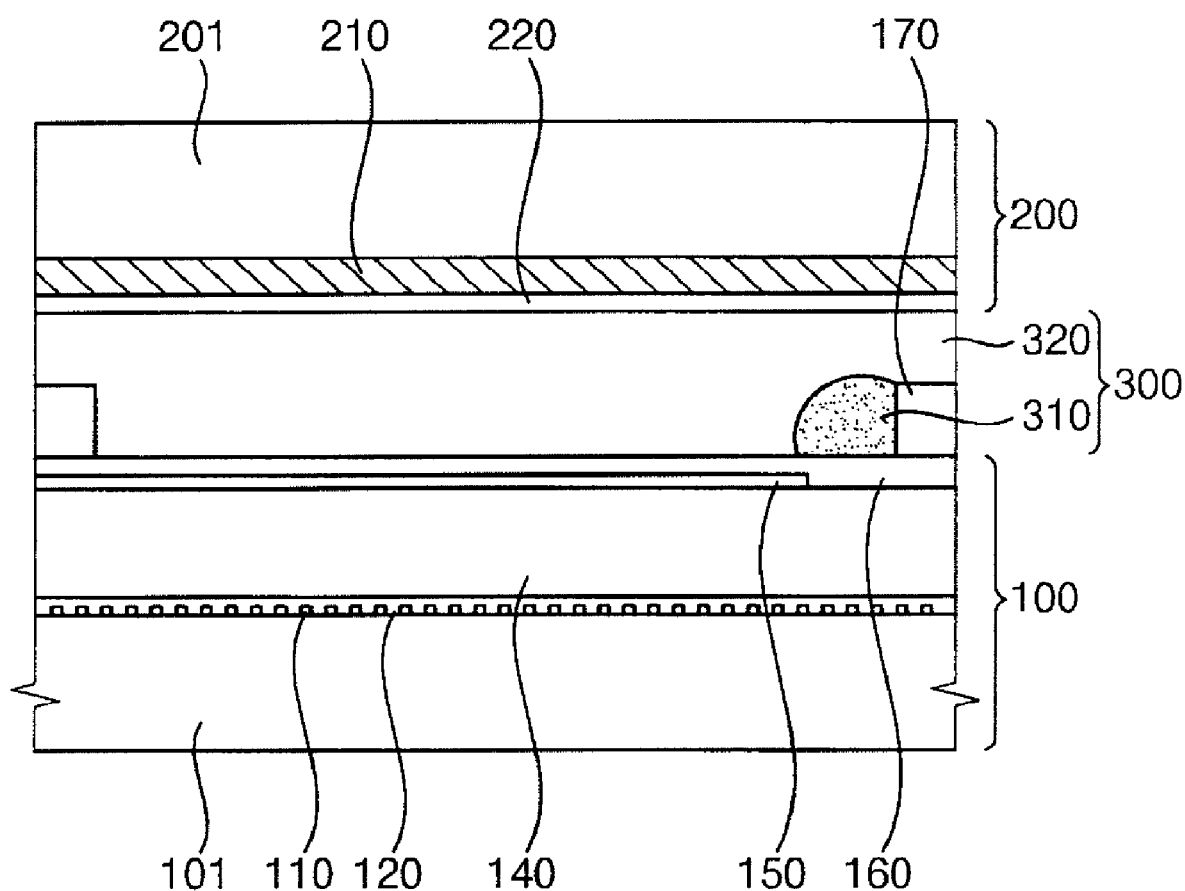
FIG. 6 is a cross-sectional view illustrating a display state of the electrowetting display panel of FIG. 2 when the electric field is applied to the electrowetting display panel.

FIG. 6 is a cross-sectional view illustrating a display state of the electrowetting display panel of FIG. 2 when the electric field is applied to the electrowetting display panel.

Referring to FIG. 6, when a voltage is applied to the first electrode 150 and the second electrode 220, the first liquid 310 in the liquid layer 300 is gathered adjacent to the hole pattern 155 formed on the first electrode 150. Therefore, incident light substantially parallel to the wire grids 110, among incident light from the exterior, is reflected by the wire grids 110 and transmitted through the liquid layer 300. Incident light substantially perpendicular to the wire grids 110, among incident light from an internal light source device (not shown), is transmitted through the wire grids 110 and transmitted through the liquid layer 300. Therefore, the display state of the electrowetting display panel 400 is a bright state.

Figure 7:
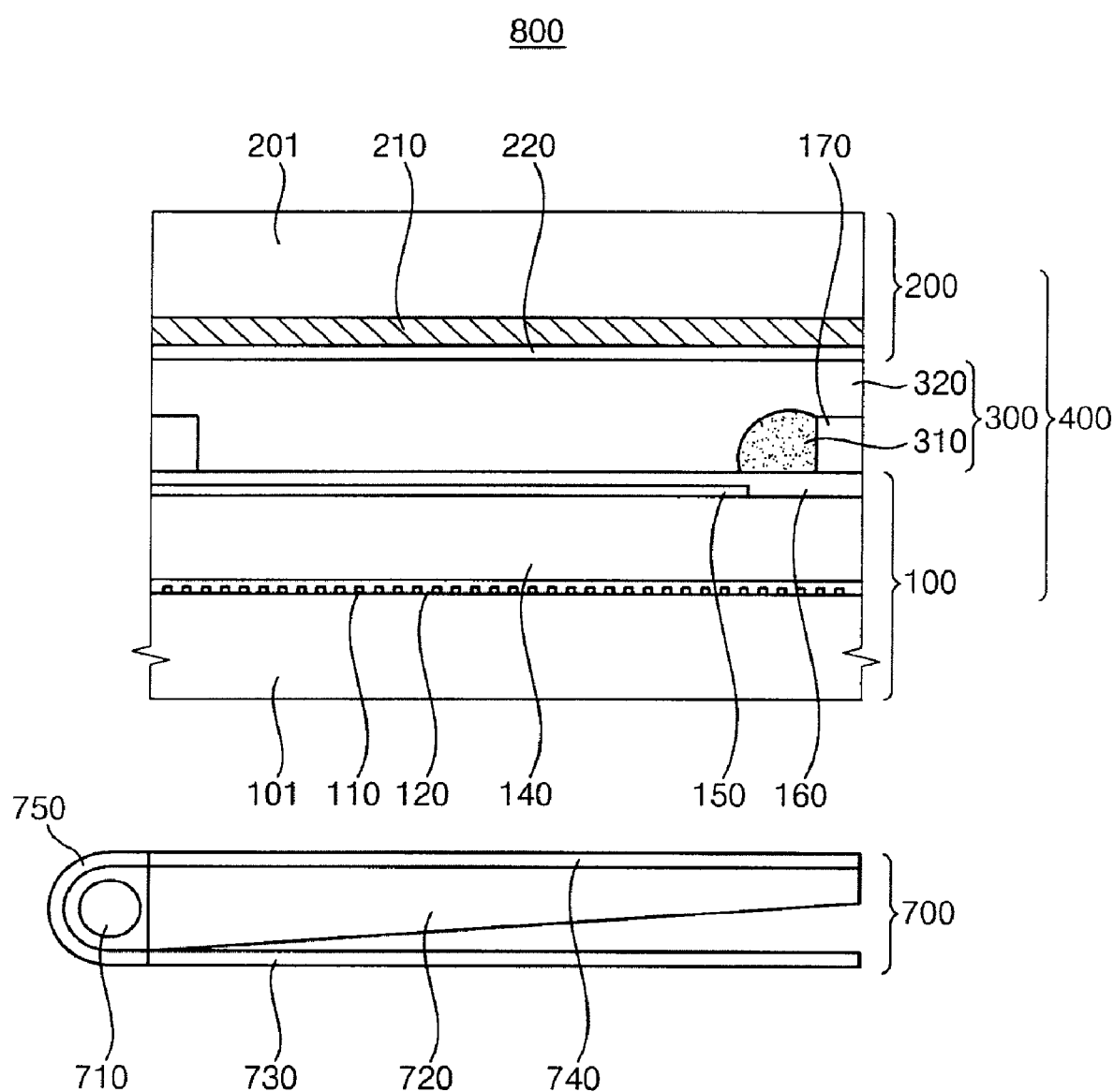
FIG. 7 is a cross-sectional view illustrating a display device including the electrowetting display panel of FIG. 2.

FIG. 7 is a cross-sectional view illustrating a display device including the electrowetting display panel of FIG. 2.

The electrowetting display panel 400 illustrated in FIG. 7 is substantially the same as the electrowetting display panel 400 illustrated in FIG. 2.

Referring to FIGS. 2 and 7, the display device 800 according to the present embodiment includes the electrowetting display panel 400 and a backlight unit 700.

The electrowetting display panel 400 includes a display substrate 100, an opposite substrate 200 and a liquid layer 300. The display substrate 100 may include a first base substrate 101, a plurality of wire grids 110, a gate insulation layer 120, an organic layer 140, a first electrode 150, a hydrophobic insulation layer 160 and a first hydrophilic pixel wall 170.

The backlight unit 700 is disposed at a lower portion of the electrowetting display panel 400. The backlight unit 700 supplies light to the electrowetting display panel 400. The backlight unit 700 includes a light source 710, a light source receiving unit 750, a light guide plate 720, a reflection plate 730 and an optical sheet 740.

The light source 710 generates light supplied to the electrowetting display panel 400. For example, light source 710 may be a cold cathode fluorescent lamp (CCFL), a flat fluorescent lamp (FFL) and a light-emitting diode (LED).

The light source receiving unit 750 holds the light source 710 and prevents light leakage through its combination with the light guide plate 720.

The light guide plate 720 is an optic plate for guiding light from the light source 710 into a front surface of the electrowetting display panel 400. According to an embodiment of the present invention, the light guide plate 720 having a wedge shape of which one end portion of is thick and another end portion is thin is illustrated; however, the shape of the light guide plate 720 may be flat so that the thicknesses of both end portions are substantially the same.

The reflection plate 730 is disposed at a lower portion of the light guide plate 720. The reflection plate 730 reflects light emitted through a bottom surface of the light guide plate 720 into the light guide plate 720 to decrease the light leakage. The reflection plate 730 may be formed as a plate or a relatively thinner sheet of which light reflectance is high.

The optical sheet(s) 740 is disposed between the electrowetting display panel 400 and the light guide plate 720. The optical sheet(s) 740 may improve optical characteristics. For example, the optical sheet(s) 740 may include a diffusion sheet for improving the luminance uniformity of light and a prism sheet for increasing front luminance of light.

The unit pixel area P may be used as a reflective area or a transmissive area by embodying the wire grids 110 in the electrowetting display panel 400. Therefore, an aperture ratio may be enhanced when the electrowetting display panel 400 is driven in a reflection mode or a transmission mode.

About 50 percent of incident light is reflected and about 50 percent of incident light is transmitted due to the characteristics of the wire grids 110. However, reflectance and transmittance may be increased due to the addition the reflection plate 730. For example, when the electrowetting display panel is driven in the reflection mode, light transmitted through the wire grids 110, among external light that is incident light from the exterior, is reflected by the reflection plate 730 and enters the wire grids 110. Therefore, optical efficiency in the reflection mode may be enhanced. Similarly, when the electrowetting display panel 400 is driven in the transmission mode, reflected light by the wire grids 110, among incident light from the light source 710, is reflected by the reflection plate 730 and enters the wire grids 110. Therefore, optical efficiency in the transmission mode may be enhanced.

When the electrowetting display panel 400 is driven in the reflection mode, the light source 710, the light guide plate 720 and the optical sheet 740 may be omitted. That is, the backlight unit 700 may include only the reflection plate 730 under display panel 400. The reflection plate 730 may be configured as a sheet and the reflection plate 730 may be attached to a surface opposite to a surface on which the wire grids 110 are formed.

Figure 8:
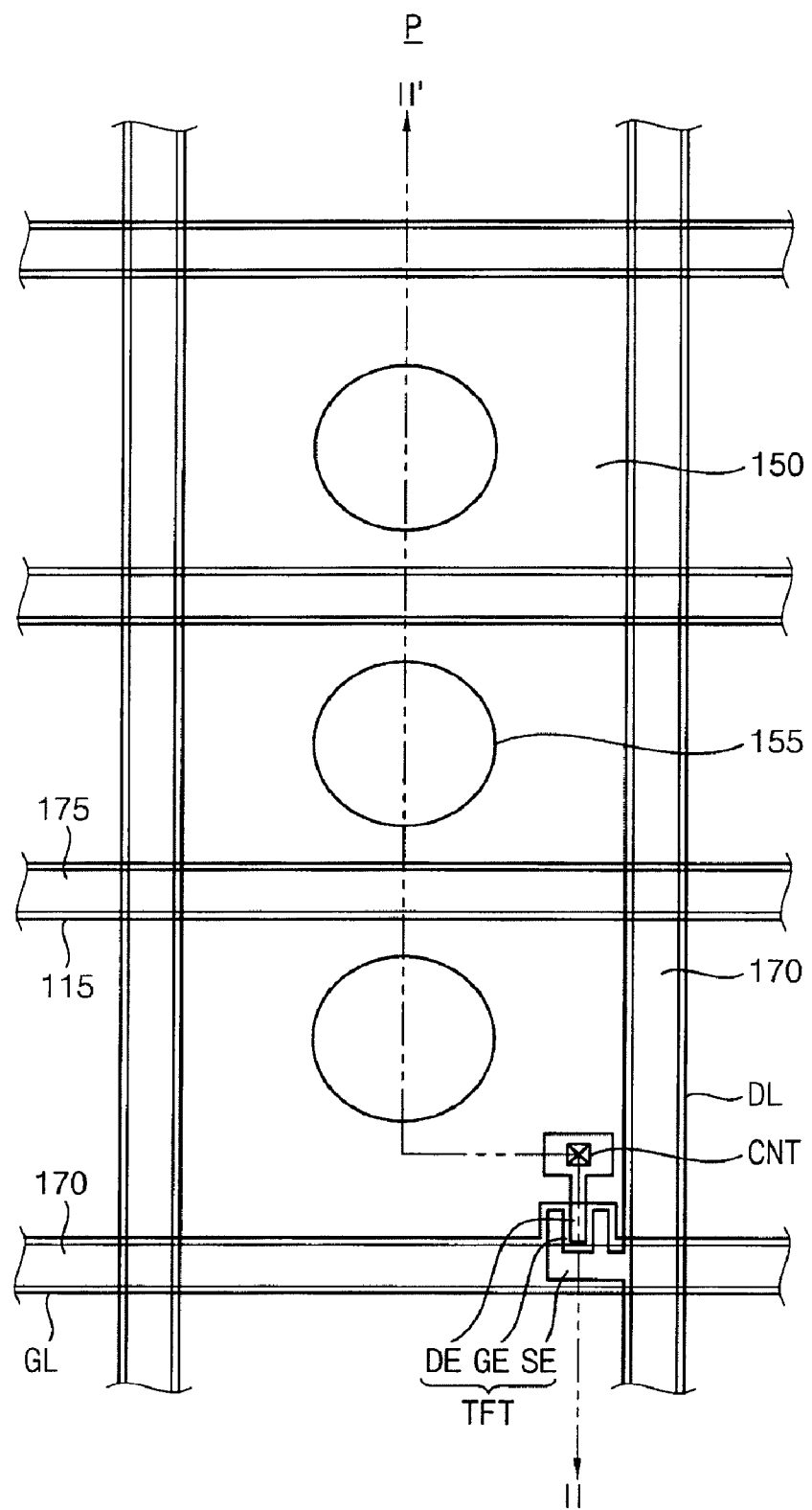
FIG. 8 is a plan view illustrating an electrowetting display panel according to an exemplary embodiment of the present invention.
Figure 9:
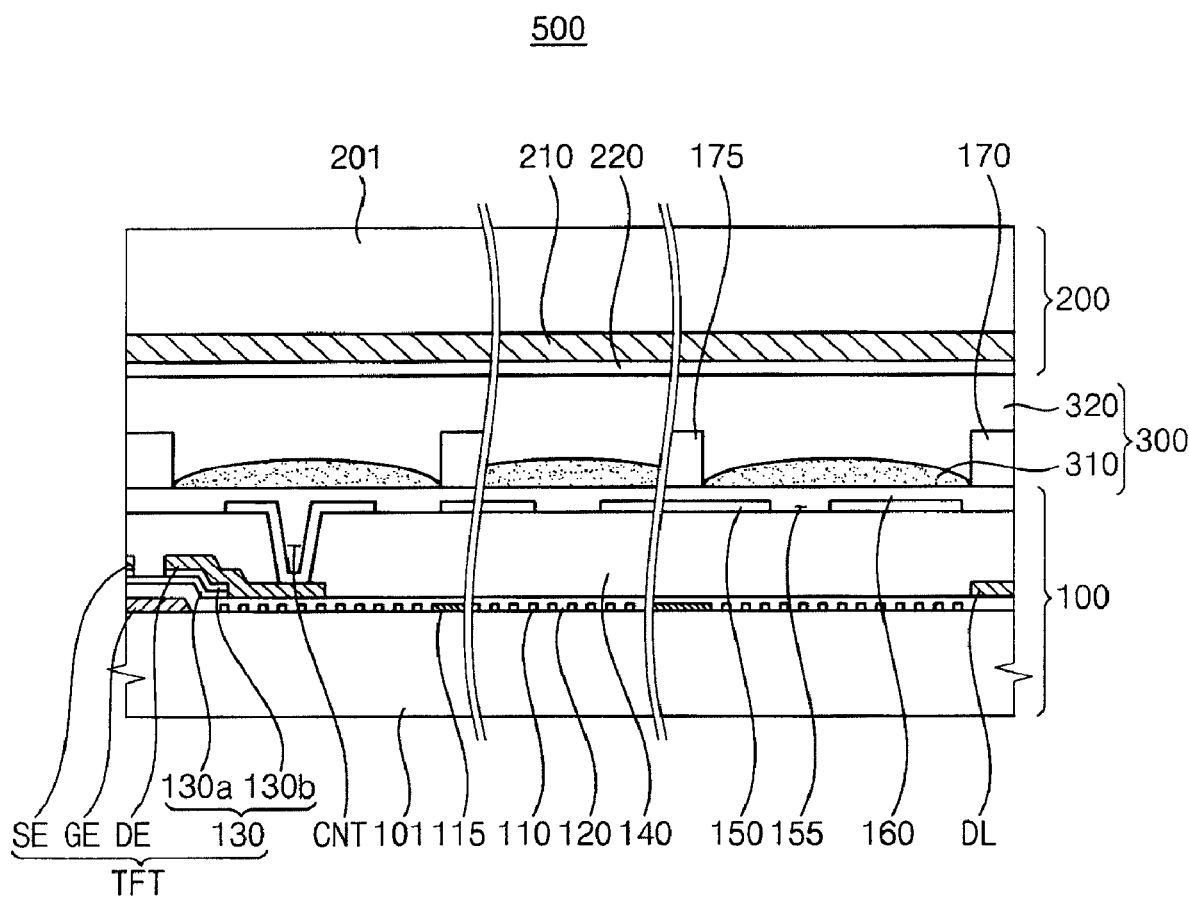
FIG. 9 is a cross-sectional view taken along a line II-II' in FIG. 8.

FIG. 8 is a plan view illustrating an electrowetting display panel according to an exemplary embodiment of the present invention. FIG. 9 is a cross-sectional view taken along a line II-II' in FIG. 8.

The electrowetting display panel 500 of FIGS. 8 and 9 according to an exemplary embodiment of the present invention is substantially the same as the electrowetting display panel 400 except that the electrowetting display panel 500 further includes light-blocking bars 115 and second hydrophilic pixel walls 175.

Referring to FIGS. 8 and 9, the electrowetting display panel 500 includes a display substrate 100, an opposite substrate 200 and a liquid layer 300.

The display substrate 100 includes a first base substrate 101, a gate line GL, a plurality of wire grids 110, the light-blocking bar 115, a gate insulation layer 120, a data line DL, a switching element TFT, an organic layer 140, a first electrode 150, a hydrophobic insulation layer 160, a first hydrophilic pixel wall 170 and the second hydrophilic pixel wall 175.

The light-blocking bar 115 is formed on a layer on which the gate line GL and the wire grids 110 are formed, and the light-blocking bar 115 is formed with the same material as that forming the gate line GL and the wire grids 110. The light-blocking bars 115 are formed substantially parallel to the gate lines GL in the unit pixel area P. The light-blocking bar 115 blocks light transmitted through the unit pixel area. The light-blocking bar 115 is disposed at a position corresponding to the second hydrophilic pixel wall 175.

The first hydrophilic pixel wall 170 is disposed on the base substrate 101 including the hydrophobic insulation layer 160. The first hydrophilic pixel wall 170 defines the unit pixel area. The first hydrophilic pixel wall 170 may be formed with a transparent material. The first hydrophilic pixel wall 170 is formed on an opaque metal line. For example, the first hydrophilic pixel wall 170 may be formed on the gate line GL and the data line DL.

The second hydrophilic pixel wall 175 divides the unit pixel area P into a plurality of sub-pixel areas Ps1, Ps2 and Ps3. The second hydrophilic pixel wall 175 may be formed with a transparent material. The second hydrophilic pixel wall 175 overlaps the light-blocking bar 115. A case in which two second hydrophilic pixel walls 175 divide the unit pixel area into three sub-pixel areas Ps1, Ps2 and Ps3 is described as an example. However, one or more than two of the second hydrophilic pixel walls 175 may be formed in the unit pixel area P. A hole pattern 155 of the first electrode 150 is formed to correspond to the respective sub-pixel areas Ps1, Ps2 and Ps3.

A method of manufacturing the display substrate 100 according to the embodiment shown in FIG. 8 is substantially the same as the method of manufacturing the display substrate 100 according the embodiment shown in FIG. 1, and thus repetitive descriptions may be omitted.

A gate metal layer is formed on the first base substrate 101 and the gate line GL, the gate electrode GE, the wire grids 110 and the light-blocking bar 115 are formed by patterning the gate metal layer. The light-blocking bar 115 is formed based on the position of the second hydrophilic pixel wall 175.

The first hydrophilic pixel wall 170 overlaps the gate line GL and the data line DL disposed on the first base substrate 101, and the second hydrophilic pixel wall 175 overlaps the light-blocking bar 115.

Figure 10:
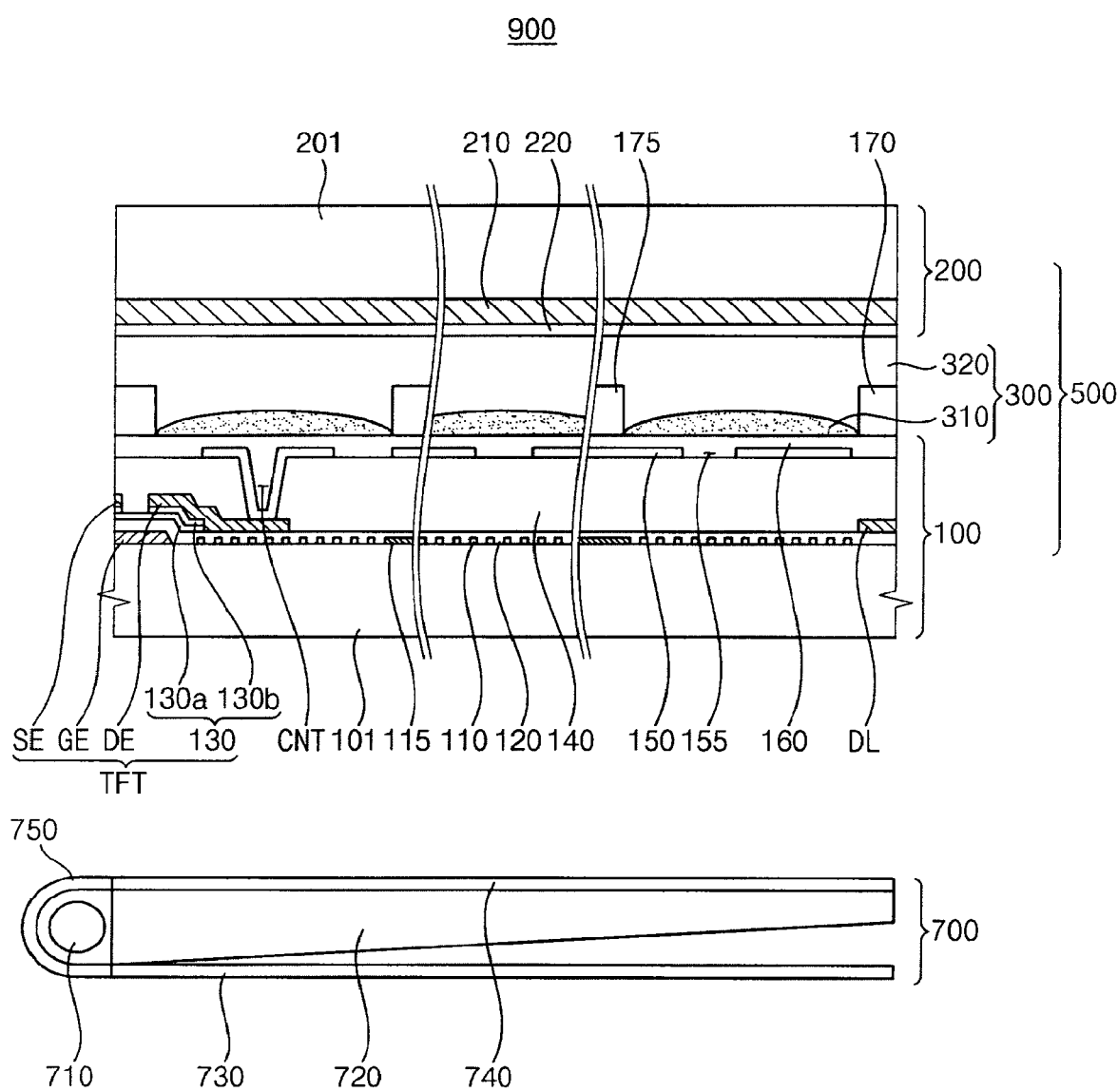
FIG. 10 is a cross-sectional view illustrating a display device including the electrowetting display panel of FIG. 9.

FIG. 10 is a cross-sectional view illustrating a display device including the electrowetting display panel of FIG. 9.

Referring to FIGS. 9 and 10, the display device 900 includes the electrowetting display panel 500 and the backlight unit 700.

The electrowetting display panel 500 includes a display substrate 100, an opposite substrate 200 and a liquid layer 300. The display substrate 100 may include a first base substrate 101, a gate line GL, a plurality of wire grids 110, a light-blocking bar 115, a gate insulation layer 120, a data line DL, a switching element TFT, an organic layer 140, a first electrode 150, a hydrophobic insulation layer 160, a first hydrophilic pixel wall 170 and a second hydrophilic pixel wall 175.

The backlight unit 700 is disposed at a lower portion of the electrowetting display panel 500. The backlight unit 700 supplies light to the electrowetting display panel 500. The backlight unit 700 is substantially the same as the backlight unit of FIG. 7.

The backlight unit 700 includes a light source 710, a light source receiving unit 750, a light guide plate 720, a reflection plate 730 and an optical sheet 740.

The light source 710 generates light supplied to the electrowetting display panel 500.

The light source receiving unit 750 holds the light source 710 and prevents light leakage through its combination with the light guide plate 720.

The light guide plate 720 is an optic plate for guiding light from the light source 710 into a front surface of the electrowetting display panel 500.

The reflection plate 730 is disposed at a lower portion of the light guide plate 720. The reflection plate 730 reflects light emitted through a bottom surface of the light guide plate 720 into the light guide plate 720 to decrease the light leakage. The reflection plate 730 may be formed as a plate or a relatively thinner sheet of which light reflectance is high.

The optical sheet(s) 740 is disposed between the electrowetting display panel 500 and the light guide plate 720. The optical sheet(s) 740 may improve optical characteristics.

When the electrowetting display panel 500 is driven in a reflection mode, the light source 710, the light guide plate 720 and the optical sheet 740 may be omitted.

According to an embodiment, the unit pixel area P is divided into the sub-pixel areas Ps1, Ps2 and Ps3 by the second hydrophilic pixel walls 175. Each of the hole patterns 155 is formed to correspond to the respective sub-pixel areas Ps1, Ps2 and Ps3, and thus the first liquid 310 is rapidly gathered into a portion in which the hole pattern 155 of the first electrode 150 is formed, when a voltage is applied to the liquid layer 300. Additionally, reflectance and transmittance may be improved by including the reflection plate 730 in the backlight unit 700.

Figure 11:
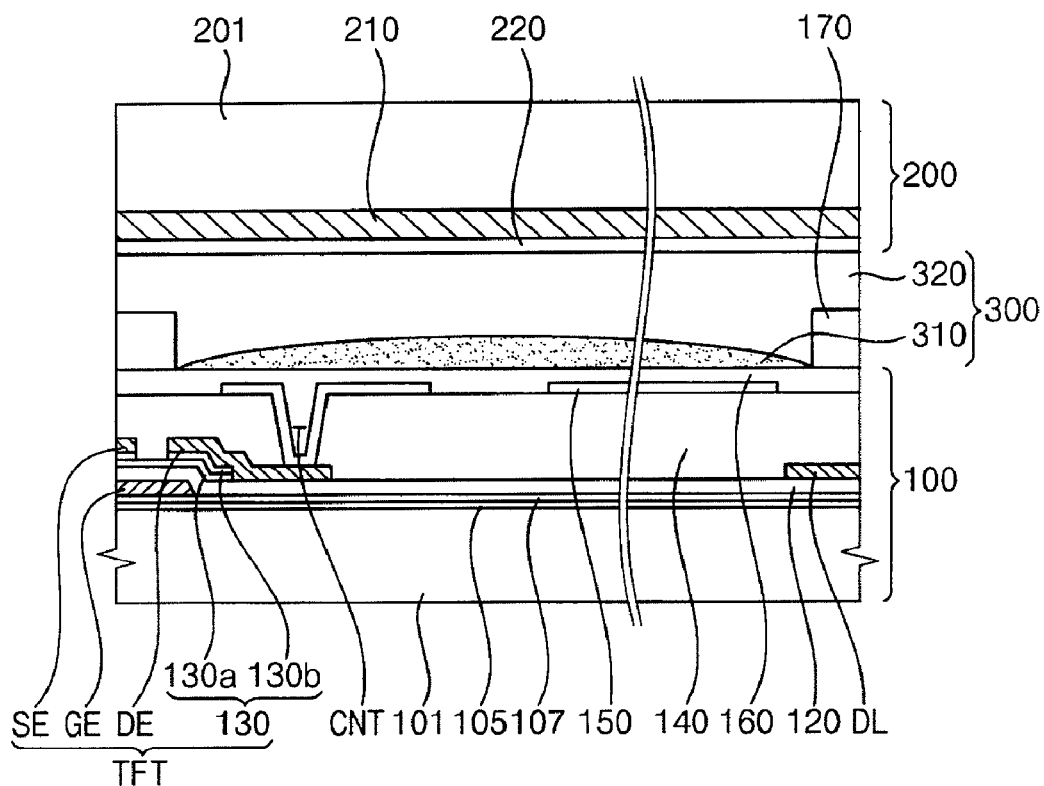
FIG. 11 is a cross-sectional view illustrating an electrowetting display panel according to an exemplary embodiment of the present invention.

FIG. 11 is a cross-sectional view illustrating an electrowetting display panel according to an embodiment of the present invention.

The electrowetting display panel 600 of FIG. 11 is substantially the same as the electrowetting display panel 400 except that the electrowetting display panel 600 includes a half mirror 105 instead of the wire grids 110.

Referring to FIG. 11, the electrowetting display panel 600 includes a display substrate 100, an opposite substrate 200 opposite to the display substrate 100 and a liquid layer 300 interposed between the display substrate 100 and the opposite substrate 200.

The display substrate 100 may include a first base substrate 101, the half mirror 105, a passivation film 107, a gate insulation layer 120, a switching element TFT, an organic layer 140, a first electrode 150, a hydrophobic insulation layer 160 and a first hydrophilic pixel wall 170.

The half mirror 105 reflects and transmits incident light of one surface of the first base substrate 101 or incident light of an opposite surface opposite to the one surface. The half mirror 105 may be manufactured by depositing a thin metal layer on a glass substrate. For example, the half mirror 105 may be manufactured by thinly depositing aluminum, nickel, etc., on the glass substrate.

The passivation film 107 is disposed on the first base substrate 101 on which the half mirror 105 is disposed.

The gate insulation layer 120 is disposed on the gate electrode GE an covers the gate electrode GE of the switching element TFT.

The electrowetting display panel 600 may include a second hydrophilic pixel wall dividing the unit pixel area P into a plurality of sub-pixel areas and a light-blocking bar blocking light transmitted through the second hydrophilic pixel wall.

Figure 12A:
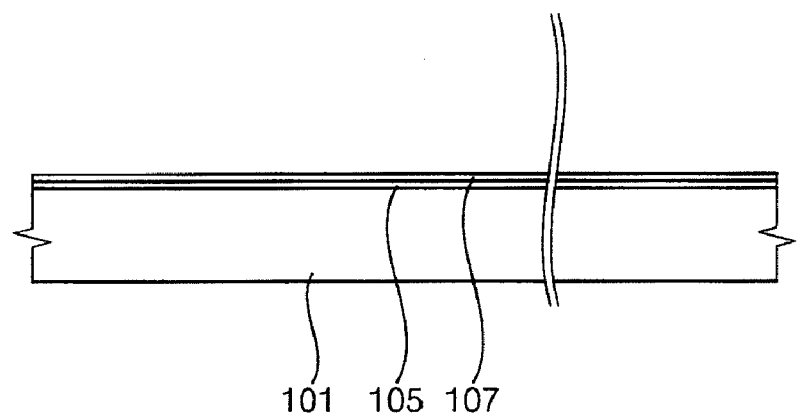
FIGS. 12A through 12C are cross-sectional views illustrating a method of manufacturing the display substrate of FIG. 11.
Figure 12B:
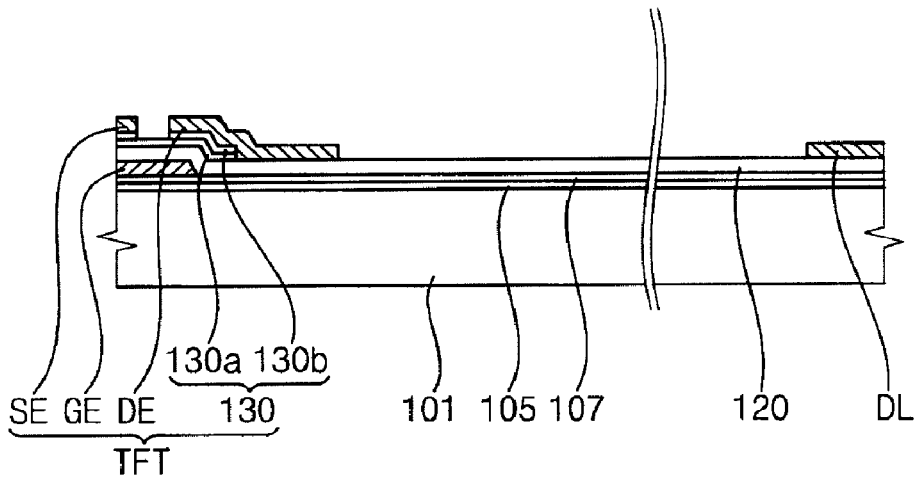
Figure 12C:
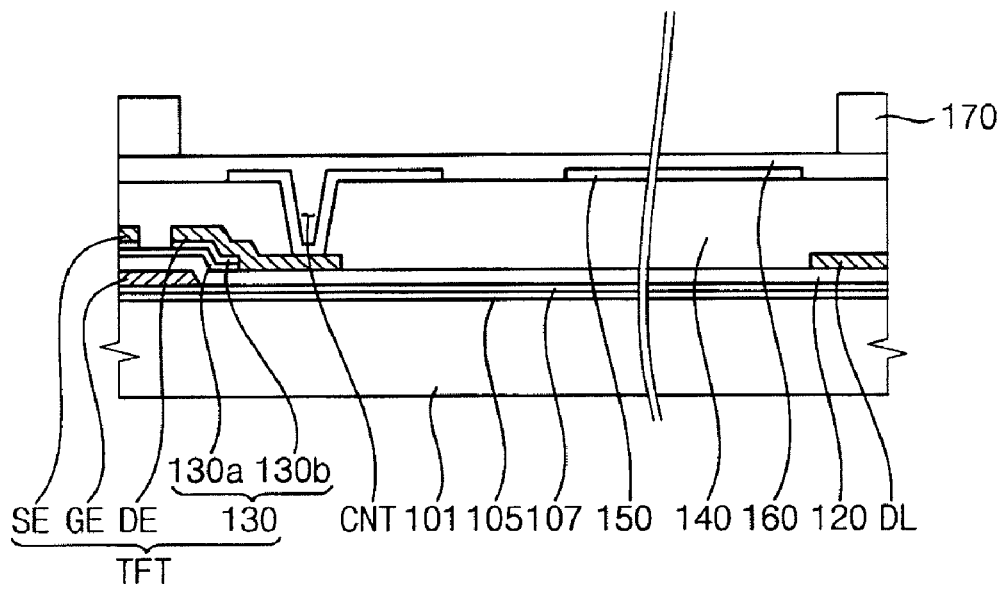

FIGS. 12A through 12C are cross-sectional views illustrating a method of manufacturing the display substrate of FIG. 11.

Referring to FIG. 12A, the half mirror 105 is formed by thinly depositing the metal layer on the first base substrate 101. The passivation film 107 is formed on the first base substrate 101 on which the half mirror 105 is formed. The passivation film 107 may be formed with silicon nitride material or silicon oxide material, etc.

Referring to FIG. 12B, a gate metal layer (not shown) is formed on the first base substrate 101 on which the passivation film 107 is formed, and the gate electrode GE is formed by patterning the gate metal layer.

The gate insulation layer 120 is formed on the first base substrate 101 on which the gate metal pattern is formed. A semiconductor layer 130a and an ohmic contact layer 130b are sequentially deposited on the first base substrate 101 on which the gate insulation layer 120 is formed, and a semiconductor pattern 130 is formed by patterning the semiconductor layer 130a and the ohmic contact layer 130b.

A source metal layer is formed on the first base substrate 101 on which the semiconductor pattern 130 is formed. A source metal pattern including a data line DL, a source electrode SE and a drain electrode DE is formed through a photoetching process of the source metal layer.

Referring to FIG. 12C, the organic layer 140 is formed on the first base substrate 101 on which the source metal pattern is formed, and a contact hole CNT is formed exposing an end portion of the drain electrode DE by exposing and developing the organic layer 140.

A transparent conductive layer is formed on the first base substrate 101 on which the organic layer 140 including the contact hole CNT is formed. The first electrode 150 is formed by patterning the transparent conductive layer.

A case where the half mirror 105 is directly disposed on the first base substrate 101 is described as an example; however, the half mirror 105 may be disposed on one or more layers between the first substrate 101 and the liquid layer 300.

Figure 13:
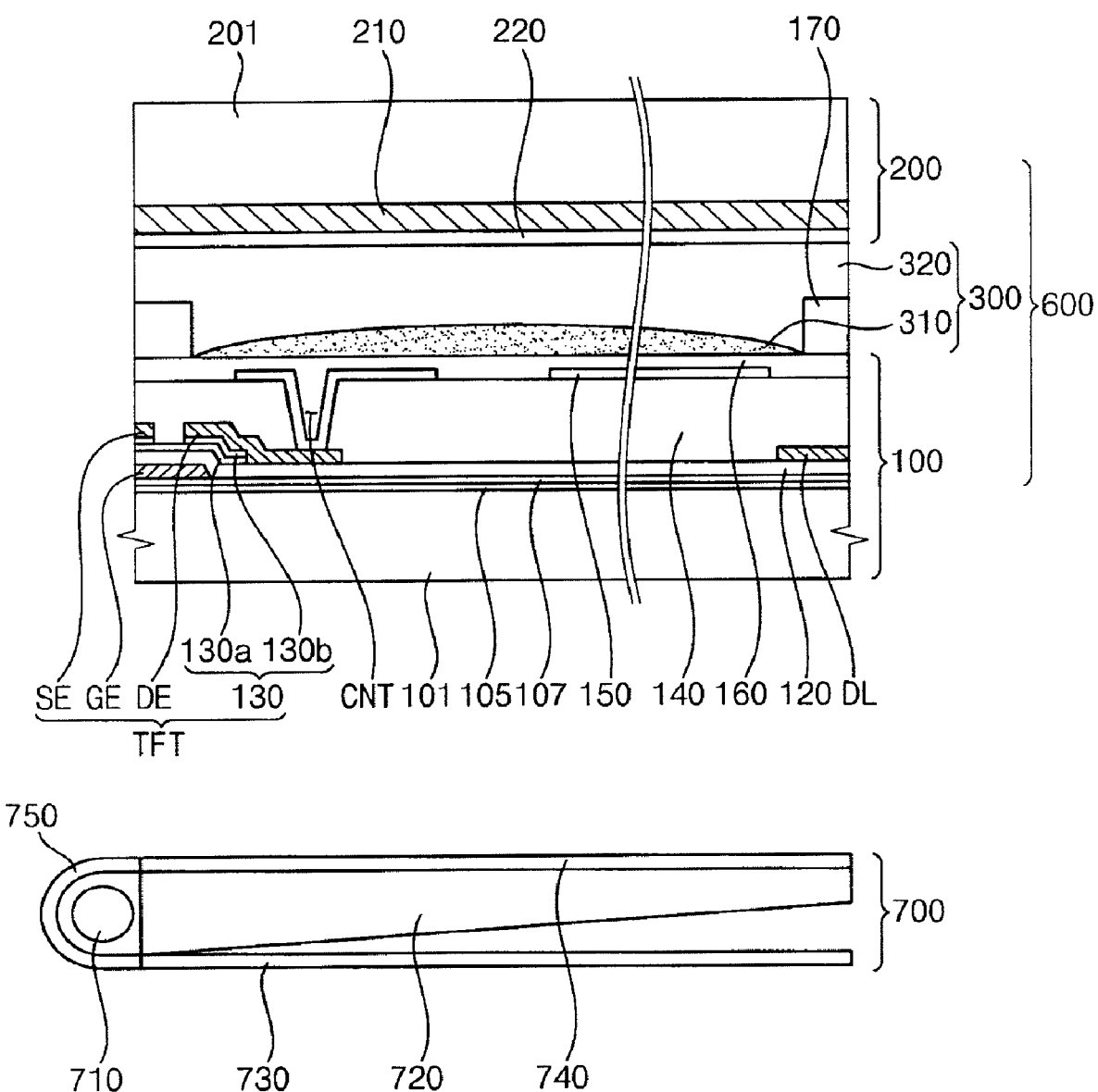
FIG. 13 is a cross-sectional view illustrating a display device including the electrowetting display panel of FIG. 11.

FIG. 13 is a cross-sectional view illustrating a display device including the electrowetting display panel of FIG. 11.

Referring to FIG. 13, the display device 1000 includes the electrowetting display panel 600 and the backlight unit 700. The electrowetting display panel 600 includes a display substrate 100, an opposite substrate 200 and a liquid layer 300.

The display substrate 100 may include a first base substrate 101, a passivation film 107, a gate insulation layer 120, a switching element TFT, an organic layer 140, a first electrode 150, a hydrophobic insulation layer 160 and a first hydrophilic pixel wall 170.

The backlight unit 700 is disposed at a lower portion of the electrowetting display panel 600. The backlight unit 700 supplies light to the electrowetting display panel 600. The backlight unit 700 includes a light source 710, a light source receiving unit 750, a light guide plate 720, a reflection plate 730 and an optical sheet 740.

The light source 710 generates light supplied to the electrowetting display panel 500.

The light source receiving unit 750 holds the light source 710 and prevents light leakage through its combination with the light guide plate 720.

The light guide plate 720 is an optic plate for guiding light from the light source 710 into a front surface of the electrowetting display panel 500.

The reflection plate 730 is disposed at a lower portion of the light guide plate 720. The reflection plate 730 reflects light emitted through a bottom surface of the light guide plate 720 into the light guide plate 720 to decrease the light leakage. The reflection plate 730 may be formed as a plate or a relatively thinner sheet of which light reflectance is high.

The optical sheet(s) 740 is disposed between the electrowetting display panel 600 and the light guide plate 720. The optical sheet(s) 740 may improve optical characteristics.

When the electrowetting display panel 500 is driven in a reflection mode, the light source 710, the light guide plate 720 and the optical sheet 740 may be omitted.

According to an embodiment, the unit pixel P may be used as a reflective area or a transmissive area by including the half mirror 105, a manufacturing process may be simplified and manufacturing costs may be decreased. Additionally, reflectance and transmittance may be improved by including the reflection plate 730 in the backlight unit 700.

According to the embodiments of the present invention, an aperture ratio may be improved because the entire area of a unit pixel area may be used as a reflective area or a transmissive area, in a reflection mode or a transmission mode. Additionally, light efficiency may be enhanced by recycling light leaked by a reflection-transmission part, by including a reflection member in a lower portion of an electrowetting display panel.

The foregoing is illustrative of embodiments of the present invention and is not to be construed as limiting thereof. Although a few example embodiments of the present invention have been described, those skilled in the art will readily appreciate that many modifications are possible in the example embodiments without materially departing from the scope of the present invention. Accordingly, all such modifications are intended to be included within the scope of the present invention as defined in the claims.

What is claimed is:

1. An electrowetting display panel comprising:
    a display substrate comprising a first base substrate, a reflection-polarization member disposed on the first base substrate to reflect and polarize incident light, a first electrode disposed on the reflection-polarization member, and a first pixel wall disposed on the first electrode, wherein the first pixel wall defines a unit pixel area;
    an opposite substrate positioned opposite to the display substrate, the opposite substrate comprising a color filter and a second electrode formed on the color filter; and
    a liquid layer interposed between the display substrate and the opposite substrate, the liquid layer comprising a first liquid having a material absorbing light and a second liquid having a specific gravity different from the specific gravity of the first liquid.

2. The electrowetting display panel of claim 1, wherein the reflection-polarization member comprises a plurality of wire grids spaced apart from each other at a uniform distance.

3. The electrowetting display panel of claim 1, wherein the reflection-polarization member comprises a half mirror.

4. The electrowetting display panel of claim 1, further comprising at least one second pixel wall dividing the unit pixel area into at least one sub-pixel area.

5. The electrowetting display panel of claim 4, further comprising a light-blocking bar overlapping the second pixel wall.

6. The electrowetting display panel of claim 1, wherein the first electrode comprises at least one hole pattern.

* * * * *